United States Patent [19]

Stillman

[11] 4,101,711
[45] Jul. 18, 1978

[54] BONE RESISTANT PACKAGING MATERIAL

[75] Inventor: Nathan Stillman, Walnut Creek, Calif.

[73] Assignee: Champion International Corporation, Stamford, Conn.

[21] Appl. No.: 779,091

[22] Filed: Mar. 18, 1977

[51] Int. Cl.² ...................... B32B 27/08; B32B 27/32; B32B 27/34; B23B 27/36
[52] U.S. Cl. .................................. 428/474; 206/484; 206/524.2; 206/819; 229/55; 426/127; 426/129; 428/480; 428/519; 428/522; 428/523
[58] Field of Search .................. 206/819, 45.31, 45.33, 206/484, 524; 426/127, 129; 428/474, 480, 484, 500, 515, 519, 520, 522, 523, 286; 229/55

[56] References Cited

U.S. PATENT DOCUMENTS

| | | | |
|---|---|---|---|
| 2,931,732 | 4/1960 | Hoffman et al. | 426/129 |
| 3,025,167 | 3/1962 | Butler | 426/127 |
| 3,423,231 | 1/1969 | Lutzmann | 428/474 |
| 3,697,368 | 10/1972 | Bhuta et al. | 428/474 |
| 3,758,373 | 9/1973 | Rich | 428/523 X |
| 3,932,693 | 1/1976 | Shaw et al. | 426/129 X |
| 3,949,135 | 4/1976 | Vercauteren | 426/127 X |
| 3,955,040 | 5/1976 | Schirmer | 426/129 X |
| 3,969,471 | 7/1976 | Driscoll | 428/523 X |
| 3,997,383 | 12/1976 | Bieler et al. | 428/474 |

OTHER PUBLICATIONS

Modern Plastics, Apr. 1968, "It's Paper, Sheet, Fabric, It's Spin-Bonded", pp. 93–96.

Primary Examiner—Harold Ansher
Attorney, Agent, or Firm—Evelyn M. Sommer

[57] ABSTRACT

A packaging laminate suitable for use in the manufacture, for instance, of bags capable of packaging bulky cuts of meat containing sharp edged bones as prepared subsequent to butchering, comprising a face or outer layer of a polyamide such as nylon, an intermediate non-woven web of synthetic resin filaments, and an inner layer formed by a grease-resistant synthetic-resin film and the bags, pouches and wrappings prepared from such laminates. The web may be spun-bonded polyester, polypropylene or polyethylene. The innermost layer may be an ionomer or an ethylene/acrylic acid copolymer.

8 Claims, 2 Drawing Figures

BONE RESISTANT PACKAGING MATERIAL

BACKGROUND OF THE INVENTION

This invention relates to a packaging laminate.

More particularly, this invention concerns such a laminate that is capable of being used as a bag for containing bulky cuts of meats having exposed sharp edged bones.

In the meat industry, a frequent problem is the shipping of the bulky meat cuts containing exposed sharp edged bones from the butchering and meat-preparation location to the site where the meat possibly is to be further processed and/or distributed. It is necessary to package the bulky cuts of meat hermetically in order to prevent drying out, exposure to contamination, and access of insects and the like.

The meat cuts are normally relatively bulky and the bones as contained therein often have relatively sharp edges. For this reason it is generally unsatisfactory to simply bag the cuts. It is standard practice either to ship the meat in waxed cartons or the like, or to place separate protectors around the sharp bone edges if bags are to be used. The use of cartons is expensive and wasteful of space. The use of bags necessitates the laborious task of applying the additionally required protectors. These protectors typically comprise woven cloth or synthetic materials impregnated with a waxy compound to give them some flexibility. The cloth or synthetic material is cut and shaped to fit over the sharp ends of the bones and the meat cuts are then bagged. Often an excess of such material is used, with resulting undesirable increase in costs.

OBJECTS OF THE INVENTION

It is therefore an object of the present invention to provide an improved packaging laminate.

Another object is to provide a packaging laminate particularly suitable for the production of a bag capable of holding bulky meat cuts containing bones having exposed sharp edges and the like.

Still another object of the invention is to provide bags or pouches of a laminate structure for containing bulky, sharp edged, greasy objects such as meat cuts having bones.

SUMMARY OF THE INVENTION

These objects are attained according to the present invention in a bag formed as a packaging laminate comprising a polyamide face film bonded to one side of a non-woven filamentary synthetic resin web. On the other side of this web, there is provided a film of an olefinic acid or ester-type synthetic resin resistant to organic solvents. The web may be spun bonded and formed of a synthetic resin such as polypropylene, polyester or polyethylene.

DETAILED DISCLOSURE

The outer polyamide face film is typically a nylon, such as nylon 6, nylon 66 or biaxial nylon. The middle layer, a non-woven filamentary synthetic resin web may, if desired, be impregnated with a waxy substance for added strength and pliability. The olefinic acid or ester type resin layer, which will be the inside of the bag formed by the laminate, functions as a sealant. It comprises, for example, an ethylene/acrylic acid copolymer or an ionomer, such as is sold under the trademark "Surlyn" by the DuPont Company. The three layers are bonded together by a suitable adhesive or primer by methods well known in the art. Where the non-woven synthetic resin web layer is wax impregnated, the wax itself may also serve as the adhesive or as a component of the adhesive system.

It has suprisingly been found that the above-described packaging laminate offers extreme strength and resistance to ripping, puncturing and tearing. The combination of the polyamide face film and the filamentary synthetic resin web bonded thereto makes a laminate of extremely good puncture resistance and excellent strength. At the same time, the bag lining formed of an olefinic acid or ester-type synthetic resin as described above prevents any grease or the like on the meat and/or bones contained therein from saturating through the bag formed by the laminate. Thus, it is possible to simply load the cuts of meat containing the bones with sharp edges into a bag formed of such a film and ship the meat cuts in this bag or to otherwise suitably wrap them in sheets of the laminated structure. The use of space-consuming and impractical cartons can be completely eliminated and the likelihood that the bags will be cut through or break open during transit is almost completely eliminated. Furthermore, since the meat cuts themselves are relatively indestructible, it is possible with such packaging to greatly ease handling and reduce shipping costs.

SPECIFIC DESCRIPTION OF PREFERRED EMBODIMENTS

Figure 1:
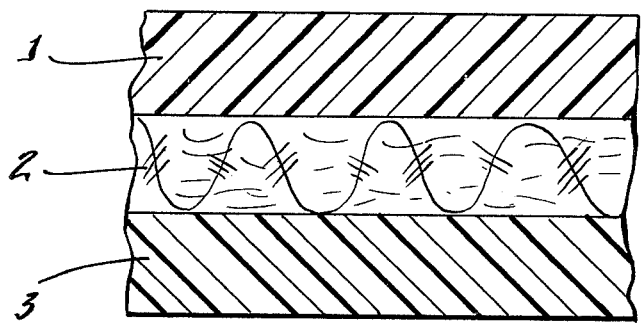
FIG. 1 is a schematic cross-sectional view of a laminate embodying the present invention.

As shown in FIG. 1, the packaging laminate basically comprises three layers. The outermost layer 1 is formed of a polyamide, here Nylon 6. The central layer 2 is a non-woven synthetic resin web here made of polypropylene, but which could equally well be made of filaments of polyester or polyethylene. Bonded to the other side of this web 2 is a layer 3 of an olefinic acid or ester type resin, here an ionomer synthetic resin sold under the trademark "Surlyn."

Figure 2:
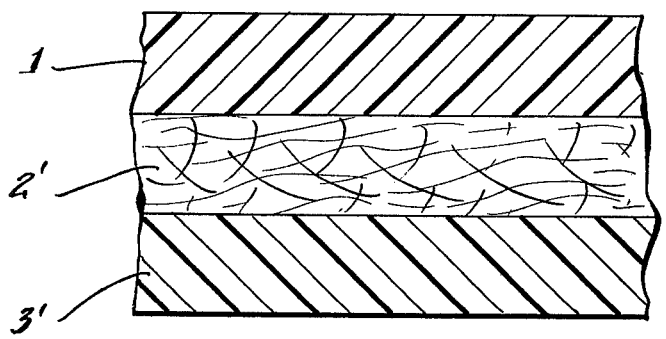
FIG. 2 is a cross-section through another embodiment of a packaging laminate according to this invention.

FIG. 2 shows another laminate having the same layer 1 as described with reference to FIG. 1, but bonded here to a layer 2' of a spun-bonded synthetic resin, here polyethylene. It would also be possible to use a spun-bonded polypropylene or polyester. In this arrangement also the innermost layer 3' is formed of an ethylene/acrylic acid copolymer. Such a copolymer is highly grease-resistant so that a bag formed of the laminate shown in FIG. 2 cannot be saturated through from the side of the layer 3' even if relatively greasy or oily meat cuts are place in it.

It is of course possible to use the layer 3 of FIG. 1 instead of the layer 3' of FIG. 2 and vice versa. Similarly, the layers 2 and 2' could be reversed.

What is claimed is:

1. A packaging laminate comprising:
   a polyamide face film;
   a filamentary non-woven synthetic-resin web bonded to said face film; and
   a film of an olefinic acid or ester-type synthetic resin resistant to organic solvents affixed to said filamentary web.

2. The laminate defined in claim 1 wherein said filamentary web is spun bonded.

3. The laminate defined in claim 2 wherein said filamentary web is polypropylene.

4. The laminate defined in claim 2 wherein said filamentary web is polyester.

5. The laminate defined in claim 2 wherein said filamentary web is polyethylene.

6. The laminate defined in claim 1 wherein said olefinic acid or ester-type resin is an ethylene/acrylic acid copolymer.

7. The laminate defined in claim 1 wherein said ester-type resin is an ionomer.

8. A bag or pouch prepared from the laminate according to claim 1.

* * * * *